United States Patent
Tseng et al.

(10) Patent No.: US 8,200,008 B2
(45) Date of Patent: Jun. 12, 2012

(54) IMAGE PROCESSING DEVICE AND METHOD FOR REDUCING COLOR ARTIFACT

(75) Inventors: Huan-Pin Tseng, Hsinchu (TW); Tsung-Han Chiang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 333 days.

(21) Appl. No.: 12/656,548

(22) Filed: Feb. 3, 2010

(65) Prior Publication Data
US 2010/0215265 A1  Aug. 26, 2010

(30) Foreign Application Priority Data
Feb. 25, 2009  (TW) .............................. 98105979 A (51) Int. Cl.
*G06K 9/00* (2006.01)
*G06K 9/40* (2006.01)
(52) U.S. Cl. ........................................ 382/167; 382/264
(58) Field of Classification Search .................. None
See application file for complete search history.

(56) References Cited

U.S. PATENT DOCUMENTS

| | | | | |
|---|---|---|---|---|
| 4,912,551 A | * | 3/1990 | Ozaki ............................ | 348/628 |
| 5,418,574 A | * | 5/1995 | Miyabata et al. ............. | 348/625 |
| 2007/0216813 A1 | * | 9/2007 | Arici et al. .................... | 348/630 |
| 2010/0002954 A1 | * | 1/2010 | Lukac ............................ | 382/274 |
| 2010/0111413 A1 | * | 5/2010 | Tsutsumi ....................... | 382/167 |

* cited by examiner

*Primary Examiner* — Li Liu
(74) *Attorney, Agent, or Firm* — Bacon & Thomas, PLLC (57) ABSTRACT

An image processing device and method is provided to reduce color artifact. A smooth unit performs a smooth operation on color signal corresponding to a pixel and adjacent pixels to generate smooth color signal. A level shifter performs a level-shifting on the smooth color signal to obtain level-shifted color signal. A color strength unit calculates a color strength indicator based on the color signal. A gray level decision unit is connected to the color strength unit for deciding whether the pixel is in a gray level region or not based on the color strength indicators of the pixel and adjacent pixels to generate a gray level indicator. An adjustment unit adjusts the smooth color signal and the level-shifted color signal based on the gray level indicator to generate an output color signal.

20 Claims, 7 Drawing Sheets

$if(Cb/Cr \geq 0)$
$Cb/Cr\_offset = Cb/Cr + offset$
$else$
$Cb/Cr\_offset = Cb/Cr - offset$
$endif$ or
$if(Cb \geq 0)$
$Cb\_offset = Cb + offset$
$else$
$Cb\_offset = Cb - offset$
$endif$ $if(Cr \geq 0)$
$Cr\_offset = Cr + offset$
$else$
$Cr\_offset = Cr - offset$
$endif$

$$Cb/Cr\_offset = Cb/Cr \times gain$$

or $$Cb\_offset = Cb \times gain$$

$$Cr\_offset = Cr \times gain$$

IMAGE PROCESSING DEVICE AND METHOD FOR REDUCING COLOR ARTIFACT

BACKGROUND OF THE INVENTION

1. Field of the Invention

The present invention relates to the technical field of image processing and, more particularly, to an image processing device and method for reducing color artifact.

2. Description of Related Art

In a DVB-T system or a cable-imaging system, a front tuner needs to modulate an image signal from radio frequency into baseband. During the process of modulation, filtering is executed in the frequency domain to avoid aliasing. But, there are overshooting, undershooting, and ringing effect to image signals in the time domain.

Figure 1:
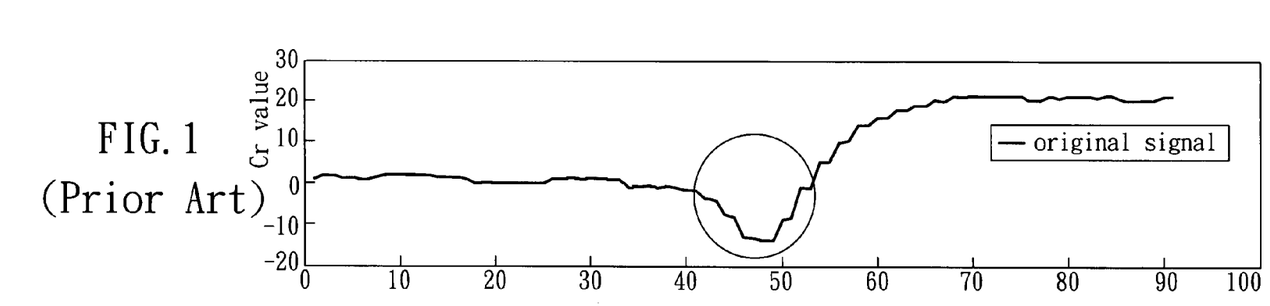
FIG. 1 is a diagram of a Cr signal in the boundary between white and yellow.
Figure 2:
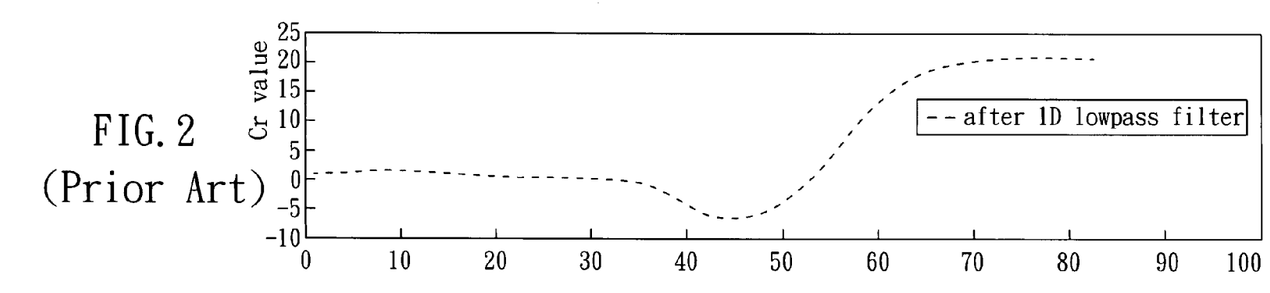
FIG. 2 is a diagram of the result of passing through a low pass filter.
Figure 3:
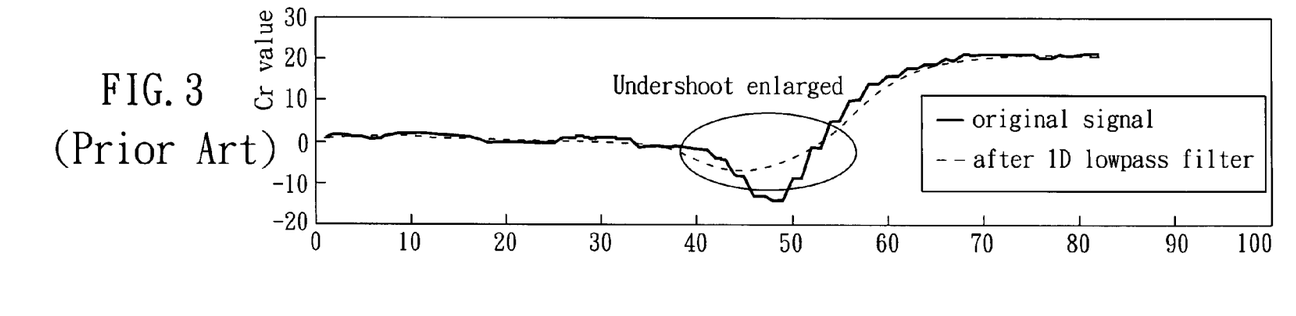
FIG. 3 is a diagram of overlapping the results of the two signals without and with passing through a low pass filter.

In order to deal with the problems of overshooting, undershooting, and ringing effect, a low pass filter is usually used to reduce the artifact in the conventional image processing techniques. FIG. 1 is a diagram of the Cr signal in the boundary between white (Cr value=0) and yellow (Cr value=20). As shown in FIG. 1, when the Cr value is equal to 0, it means that the color component of Cr is the smallest. The circle in FIG. 1 shows the artifact owing to undershooting (Cr value<0) occurs, and then results in an exceeded color boundary in images. The processing method of the conventional techniques is to use a low pass filter to reduce the artifact. As shown in FIG. 2, it is the result of passing through a low pass filter. FIG. 3 is a diagram about overlapping the results of the two signals without and with passing through a low pass filter. It is known from FIG. 3 that after the filtering process, undershooting of the signal is reduced. But the range of undershooting in FIG. 3 becomes larger. Namely, using low pass filters causes the light-color area of the original signal to have stronger color, so that the artifact of color bleeding in the image is induced. The artifact, mainly in the boundary between different colors, causes an image, which is in gray level originally, to have other colors after the filtering process. Such as the problem of color bleeding has green (in the undershooting area) in the boundary between white and yellow.

The conventional image processing techniques generally use filters for reducing overshooting, undershooting, and ring effect, but the artifact of color bleeding is not considered. Thus, it is desirable to provide an improved image processing device and method to mitigate and/or obviate the aforementioned problems.

SUMMARY OF THE INVENTION

The object of the present invention is to provide an image processing device and method for reducing color artifact, which can reduce the artifact of overshooting, undershooting, ring effect and color bleeding produced by using filters in the conventional image processing techniques.

According to a feature of the invention, an image processing device for reducing color artifact is provided. The image processing device for reducing color artifact includes a smooth unit, a level shifter, a color strength unit, a gray level decision unit, and an adjustment unit. The smooth unit receives color signal corresponding to a pixel and adjacent pixels, and performs a smooth operation on the color signal to generate a smooth color signal Cb/Cr_smooth. The level shifter receives the color signal Cb/Cr and a luminance signal Y corresponding to the pixel, and performs a level-shifting on the color signal Cb/Cr based on the luminance signal Y to generate a level-shifted color signal Cb/Cr_offset. The color strength unit receives the color signal Cb/Cr, and calculates a color strength indicator strength corresponding to the pixel based on the color signal Cb/Cr. The gray level decision unit is connected to the color strength unit, and determines whether the pixel is in a gray level region or not based on the color strength indicators strength corresponding to the pixel and adjacent pixels to generate a gray level indicator Cmean of the pixel. The adjustment unit is connected to the smooth unit, the level shifter, and the gray level decision unit, and adjusts the smooth color signal Cb/Cr_smooth and the level-shifted color signal Cb/Cr_offset based on the gray level indicator Cmean to generate an output color signal Cb/Cr_out of the pixel.

According to another feature of the invention, an image processing method implemented in an image processing device for reducing color artifact is provided, which includes a smooth step for receiving color signal corresponding to a pixel and adjacent pixels, and performing a smooth operation on the color signals to generate a smooth color signal of the pixel; a level-shifted step for receiving the color signal and a luminance signal corresponding to the pixel, and performing a level-shifting on the color signal based on the luminance signal to generate a level-shifted color signal; a color strength calculating step for receiving the color signal, and calculating a color strength indicator based on the color signal; a gray level deciding step for determining whether the pixel is in a gray level region or not based on the color strength indicators corresponding to the pixel and adjacent pixels to generate a gray level indicator of the pixel; and an adjusting step for adjusting the smooth color signal and the level-shifted color signal based on the gray level indicator to generate an output color signal.

DETAILED DESCRIPTION OF THE PREFERRED EMBODIMENT

Figure 4:
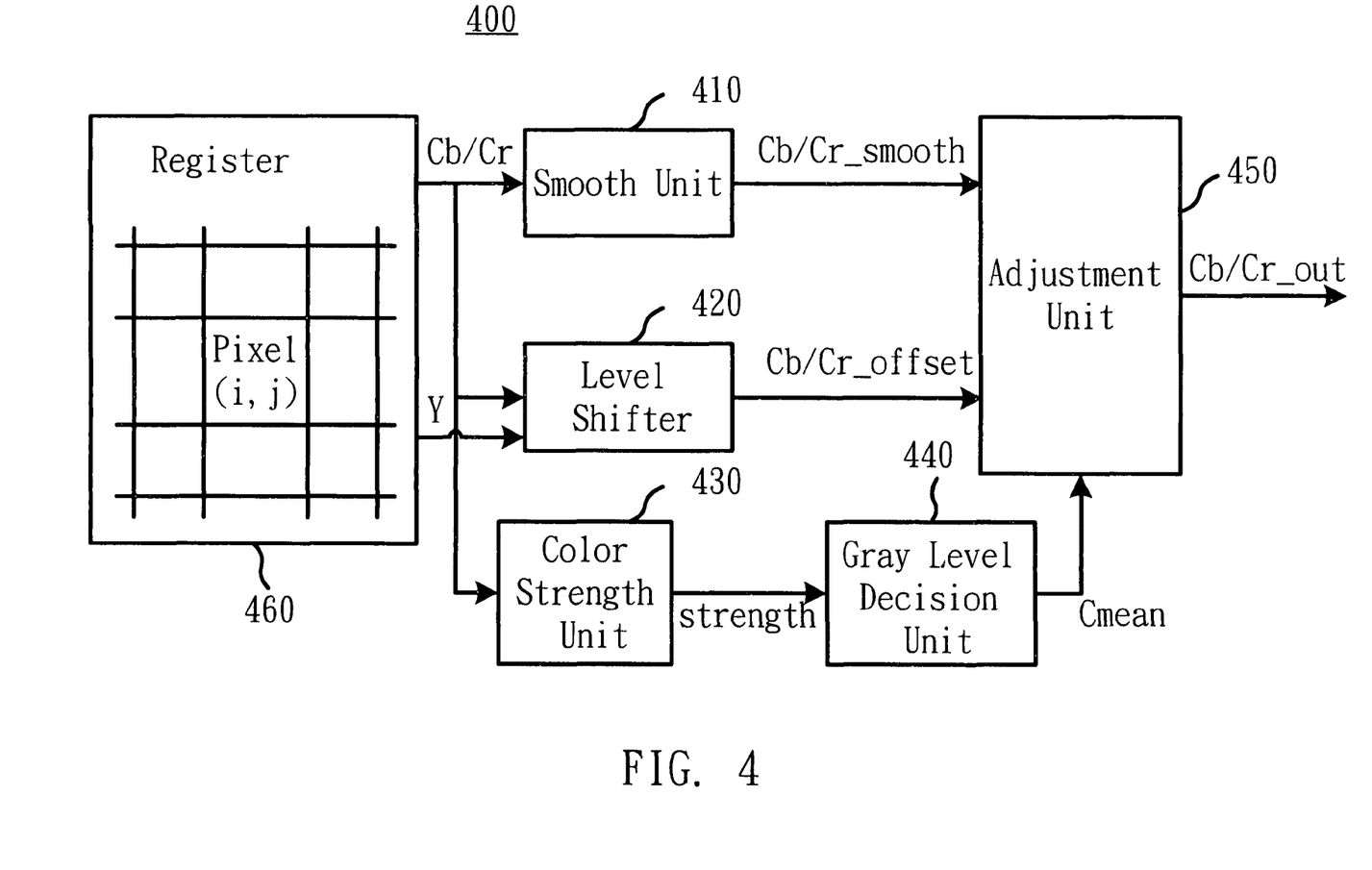
FIG. 4 is a block diagram of an image processing device for reducing color artifact in accordance with the invention.

FIG. 4 is a block diagram of an image processing device 400 for reducing color artifact in accordance with the invention. The image processing device 400 is implemented in a video player, such as a television set, for reducing color artifact encountered in the received image signals. The image processing device 400 is provided to reduce the artifact of overshooting, undershooting, ring effect and color bleeding. The image processing device 400 includes a smooth unit 410, a level shifter 420, a color strength unit 430, a gray level decision unit 440, and an adjustment unit 450. The smooth unit 410 receives color signal Cb/Cr corresponding to a pixel and its adjacent pixels, and performs a smooth operation on the color signal Cb/Cr to generate a smooth color signal Cb/Cr_smooth of the pixel.

The level shifter 420 receives the color signal Cb/Cr and a luminance signal Y corresponding to the pixel, and performs a level-shifting on the color signal Cb/Cr based on the luminance signal Y to generate a level-shifted color signal Cb/Cr_offset.

The color strength unit 430 receives the color signal Cb/Cr corresponding to the pixel, and calculates a color strength indicator, denoted by strength, based on the color signal Cb/Cr corresponding to the pixel. The color strength unit 430, for example, could calculate the color strength indicator strength corresponding to the pixel based on the following formula:

$$strength = Cr^2 + Cb^2,$$

where Cr, Cb represent the color signal Cb/Cr.

The gray level decision unit 440 is connected to the color strength unit 430 for deciding whether the pixel is in a gray level region or not based on the color strength indicators corresponding to the pixel and its adjacent pixels, so as to generate a gray level indicator Cmean corresponding to the pixel.

The adjustment unit 450 is connected to the smooth unit 410, the level shifter 420, and the gray level decision unit 440, for adjusting the smooth color signal and the level-shifted color signal based on the gray level indicator to generate an output color signal Cb/Cr_out.

Figure 5:
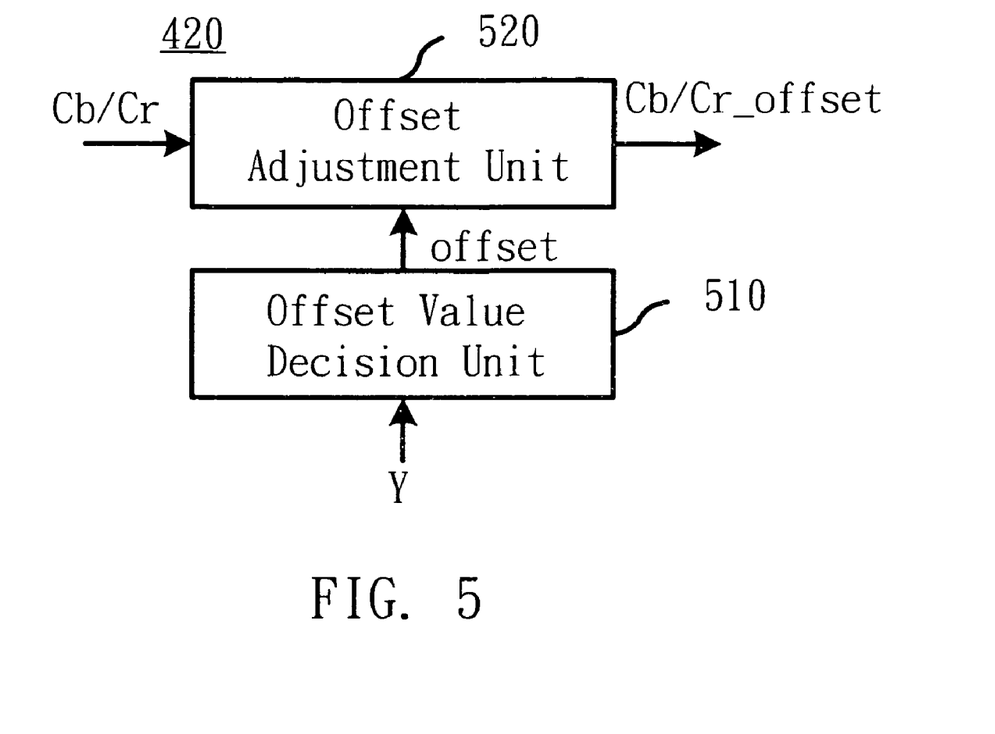
FIG. 5 is a block diagram of a level shifter in accordance with the invention.

FIG. 5 is a block diagram of the level shifter 420 in accordance with the invention. The level shifter 420 includes an offset value decision unit 510, and an offset adjustment unit 520.

The offset value decision unit 510 receives the luminance signal Y corresponding to the pixel, and generates an offset value offset based on the luminance signal Y. The offset adjustment unit 520 is connected to the offset value decision unit 510 for receiving the offset value offset and the color signal Cb/Cr to generate the level-shifted color signal Cb/Cr_offset.

Figure 6:
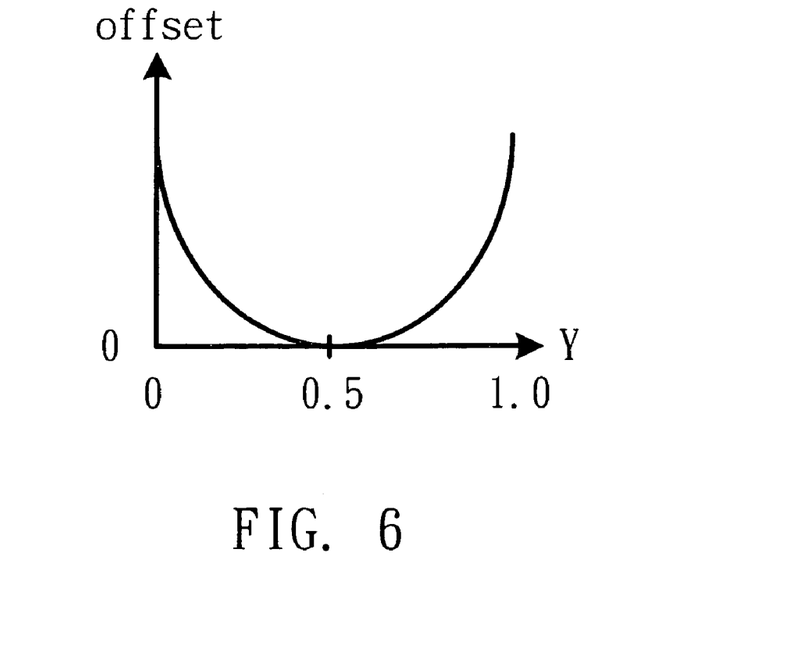
FIG. 6 is a diagram showing the relationship between a luminance signal Y and an offset value in accordance with the invention.

FIG. 6 is a diagram showing the relationship between the luminance signal Y and the offset value offset in accordance with the invention. In FIG. 6, the value of the luminance signal Y is in the range from 0 to 1, and when the luminance signal Y is represented by 8 bits, the value of the luminance signal Y is in the range from 0 to 255. Namely, when the value of the luminance signal Y is 0.5, it corresponds to 128. The value of a general color signal Cb/Cr is in the range from −0.5 to +0.5. When the color signal is represented by 8-bit representation, the value of color signal is in the range from 0 to 255.

The offset value decision unit 510 proceeds to look up a first table based on the luminance signal Y corresponding to the pixel to generate the offset value offset. Also, the relationship between the luminance signal Y and the offset value offset in FIG. 6 could be generated in the offline mode, and then stored into the first table.

Figure 7:
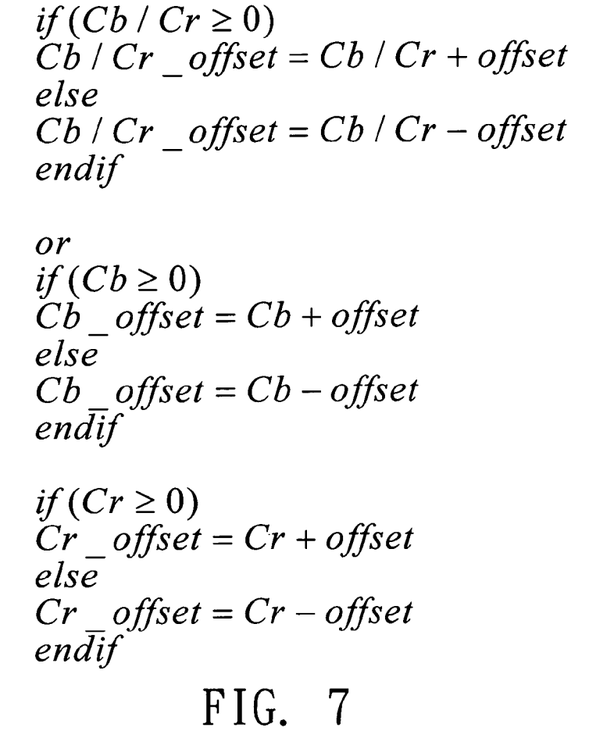
FIG. 7 is a diagram showing the program code of an offset adjustment unit in accordance with the invention.

FIG. 7 is a diagram showing the program code of the offset adjustment unit 520. When the color signal Cb/Cr is not smaller than 0, the offset value offset is added to the color signal Cb/Cr to generate the level-shifted color signal Cb/Cr_offset. When the color signal Cb/Cr is smaller than 0, the offset value offset is subtracted from the color signal Cb/Cr to generate the level-shifted color signal Cb/Cr_offset. The program code in FIG. 7 could be converted into hardware by a hardware description language, such as System C or VHDL, which is well known to those skilled in the art and thus a detailed description is deemed unnecessary.

Figure 8:
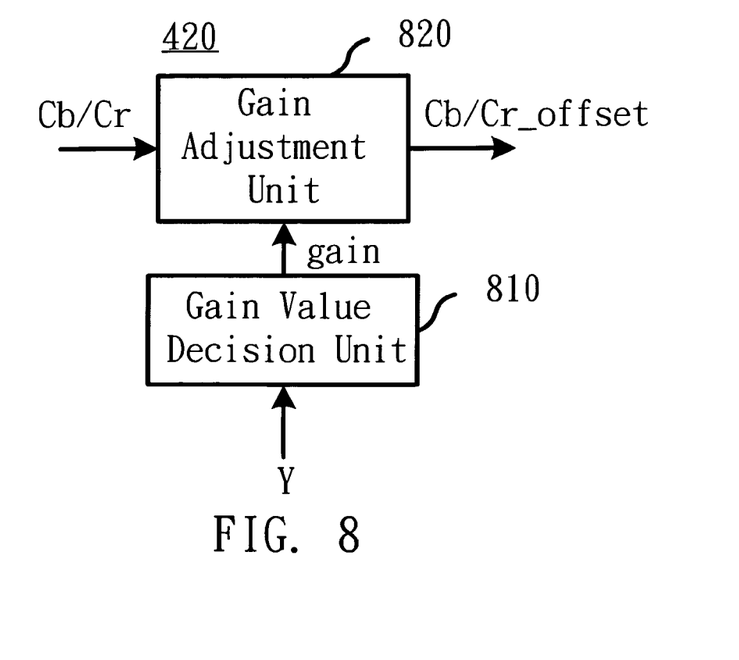
FIG. 8 is a block diagram of a level shifter in accordance with another embodiment of the invention.

FIG. 8 is a block diagram of the level shifter 420 according to another embodiment of the invention. The level shifter 420 includes a gain value decision unit 810 and a gain adjustment unit 820.

The gain value decision unit 810 receives the luminance signal Y corresponding to the pixel, and generates a gain value gain based on the luminance signal Y. The gain value decision unit 810 proceeds to look up a second table based on the luminance signal Y corresponding to the pixel to generate the gain value gain. The gain adjustment unit 820 is connected to the gain value decision unit 810 for receiving the gain value gain and the color signal Cb/Cr corresponding to the pixel, and multiplying the color signal Cb/Cr by the gain value gain to generate the level-shifted color signal Cb/Cr_offset.

Figure 9:
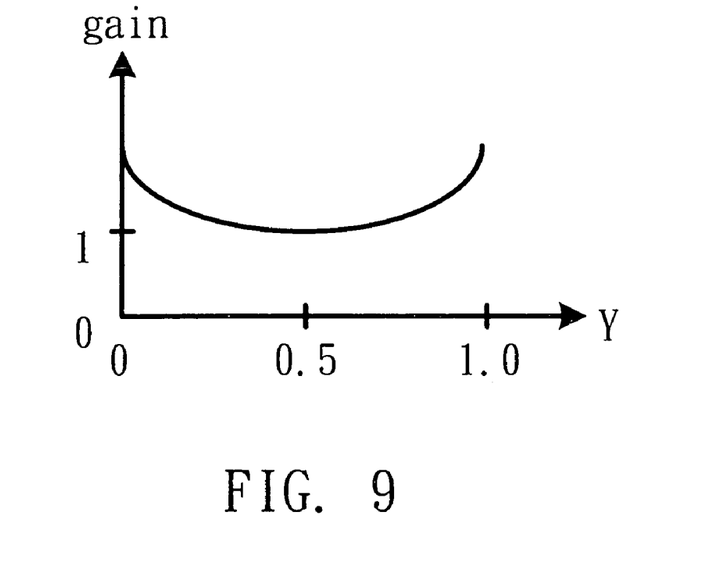
FIG. 9 is a diagram showing the relationship between a luminance signal Y and a gain value gain in accordance with the invention.
Figure 10:
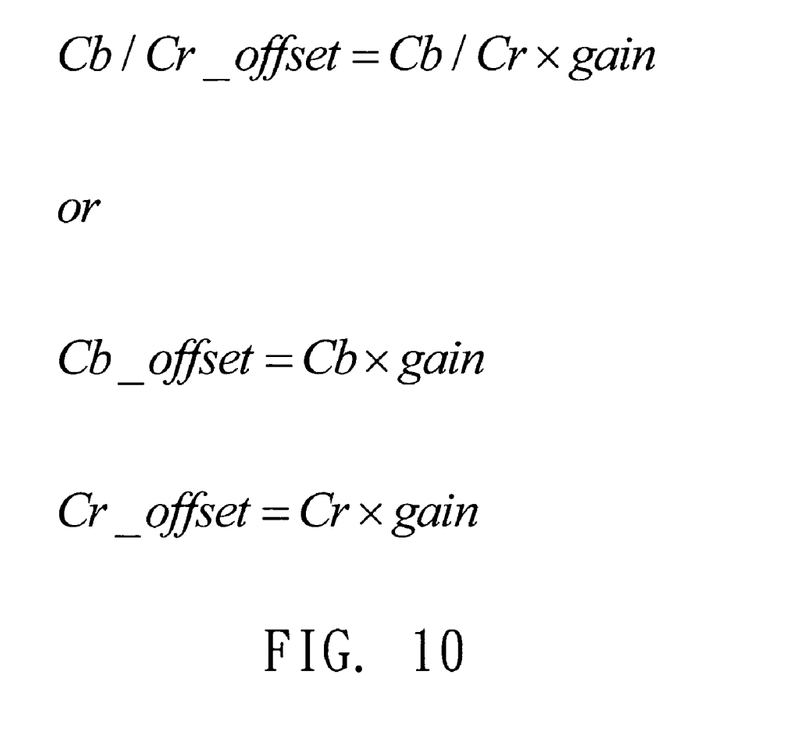
FIG. 10 is a diagram showing the program code of a gain adjustment unit in accordance with the invention.

FIG. 9 is a diagram showing the relationship between the luminance signal Y and the gain value gain. FIG. 10 is a diagram showing the program code of the gain adjustment unit 820.

Figure 11:
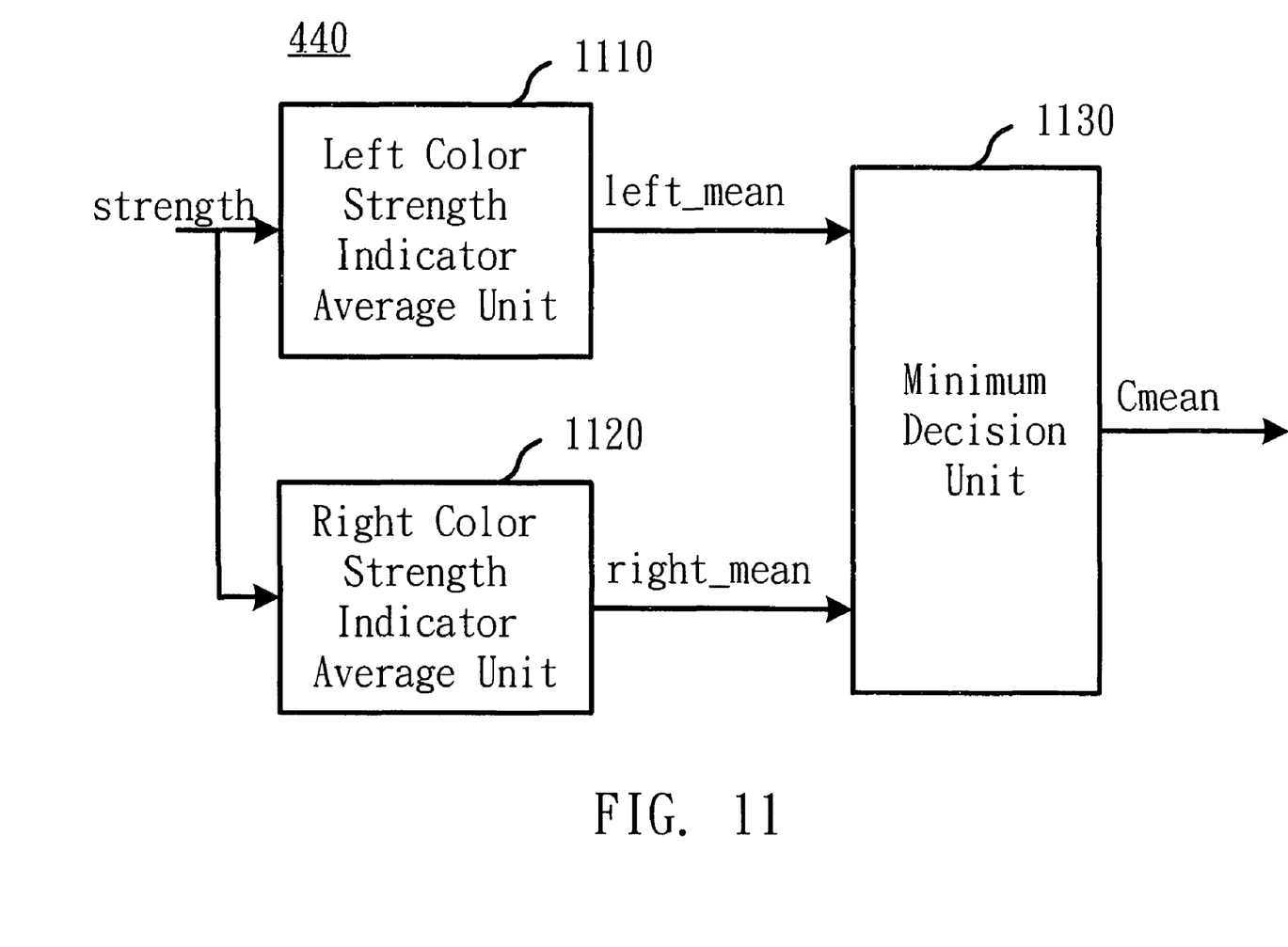
FIG. 11 is a block diagram of the gray level decision unit in accordance with the invention.

FIG. 11 is a block diagram of the gray level decision unit 440 in accordance with the invention. The gray level decision unit 440 includes a left color strength indicator average unit 1110, a right color strength indicator average unit 1120, and a minimum decision unit 1130.

The left color strength indicator average unit 1110 receives the color strength indicators strength corresponding to the pixel and its left side adjacent pixels from the adjacent pixels to generate a left color strength average indicator left_mean. The left color strength average indicator left_mean can be represented by the following formula:

$$\text{left\_mean} = [strength(i,j) + strength(i,j-1) + strength(i,j-2) + strength(i,j-3)] \div 4,$$

where strength(i, j) is the color strength indicator corresponding to the pixel, strength(i, j−1) is the color strength indicator corresponding to an adjacent pixel at the first left side of the pixel, strength(i, j−2) is the color strength indicator corresponding to an adjacent pixel at the second left side of the pixel, and strength(i, j−3) is the color strength indicator corresponding to an adjacent pixel at the third left side of the pixel.

The right color strength indicator average unit 1120 receives the color strength indicators strength corresponding to the pixel and its right side adjacent pixels from the adjacent pixels to generate a right color strength average indicator right_mean. The right color strength average indicator right_mean can be represented by the following formula:

$$\text{right\_mean} = [strength(i,j) + strength(i,j+1) + strength(i,j+2) + strength(i,j+3)] \div 4,$$

where strength(i, j+1) is the color strength indicator corresponding to an adjacent pixel at the first right side of the pixel, strength(i, j+2) is the color strength indicator corresponding to an adjacent pixel at the second right side of the pixel, and strength(i, j+3) is the color strength indicator corresponding to an adjacent pixel at the third right side of the pixel.

The minimum decision unit 1130 is connected to the left color strength indicator average unit 1110 and the right color strength indicator average unit 1120 for choosing and outputting one of the left color strength indicator and the right color strength indicator as the gray level indicator Cmean.

Figure 12:
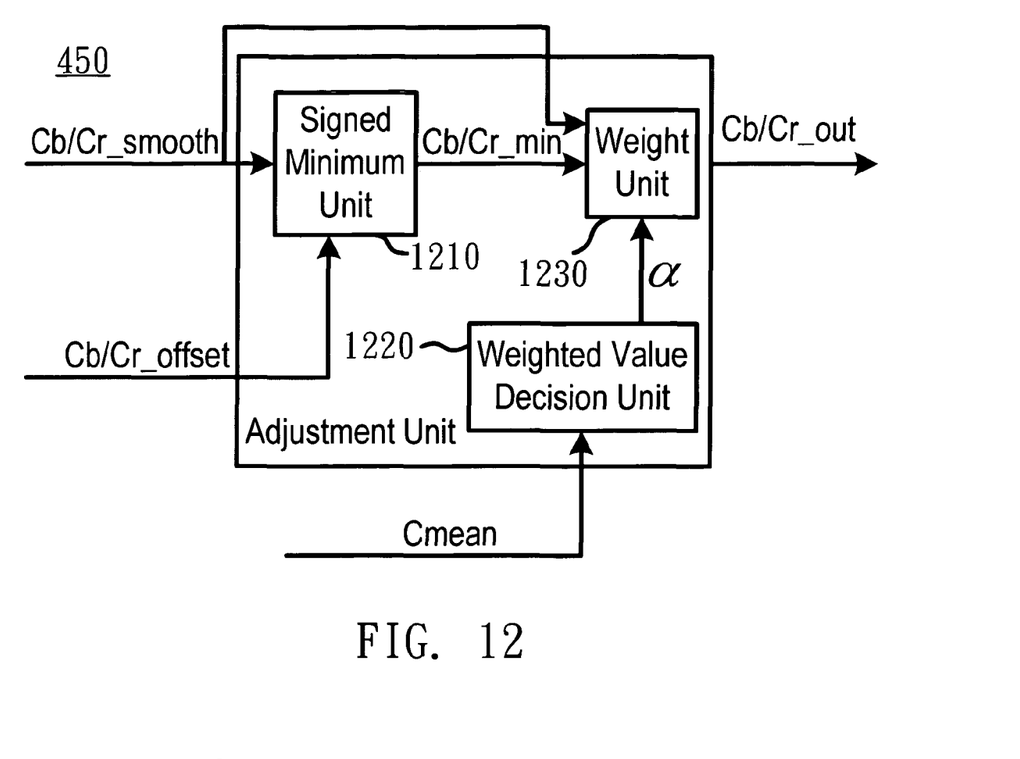
FIG. 12 is a block diagram of an adjustment unit in accordance with the invention.

FIG. 12 is a block diagram of the adjustment unit 450 according to the invention. The adjustment unit 450 includes a signed minimum unit 1210, a weighted value decision unit 1220, and a weight unit 1230.

The signed minimum unit 1210 is connected to the smooth unit 410 and the level shifter 420. When the smooth color signal Cb/Cr_smooth is not smaller than zero, the signed minimum unit 1210 chooses the smaller one of the smooth color signal Cb/Cr_smooth and the level-shifted color signal Cb/Cr_offset for being outputted as a color extreme signal Cb/Cr_min. When the smooth color signal Cb/Cr_smooth is smaller than zero, the signed minimum unit 1210 chooses the bigger one of the smooth color signal Cb/Cr_smooth and the level-shifted color signal Cb/Cr_offset for being outputted as the color extreme signal Cb/Cr_min.

Figure 13:
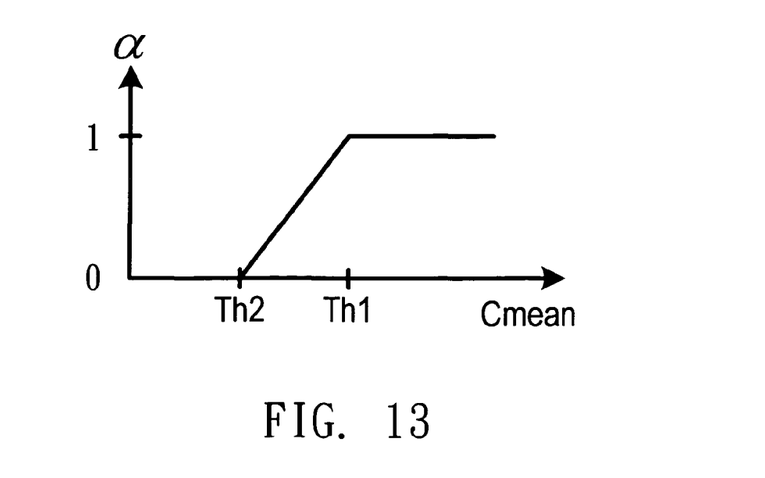
FIG. 13 is a diagram showing the relationship between a gray level indicator Cmean and a weighted value α in accordance with the invention.

The weighted value decision unit 1220 is connected to the gray level decision unit 440 for generating a weighted value α based on the gray level indicator Cmean. FIG. 13 is a diagram showing the relationship between the gray level indicator Cmean and the weighted value α. As shown in FIG. 13, when the gray level indicator Cmean is bigger than a first threshold value Th1, the weighted value α is 1. When the gray level indicator Cmean is smaller than a second threshold value Th2, the weighted value α is 0. When the gray level indicator Cmean is not smaller than the second threshold value and not bigger than the first threshold value (Th2≦Cmean≦Th1), the weighted value α and the gray level indicator Cmean have a linear relationship.

The weight unit 1230 is connected to the smooth unit 410, the signed minimum unit 1210, and the weighted value decision unit 1220, for performing a weighted operation with the smooth color signal Cb/Cr_smooth and the color extreme signal Cb/Cr_min based on the weighted value α to generate the output color signal Cb/Cr_out. The weight unit 1230, for example, could generate the output color signal Cb/Cr_out based on the following formula:

$$Cb/Cr\_out = \alpha \times Cb/Cr\_smooth + (1-\alpha) \times Cb/Cr\_min.$$

The smooth unit 410 could be a one-dimensional low pass filter or a two-dimensional low pass filter. When the smooth unit 410 is a one-dimensional low pass filter, its coefficient could be, for example, [1 2 2 2 2 2 2 2 1]/16. When the smooth unit 410 is a two-dimensional low pass filter, its filter coefficient could be, for example:

$$\frac{\begin{bmatrix} 1 & 2 & 2 & 2 & 2 & 2 & 2 & 2 & 1 \\ 2 & 4 & 4 & 4 & 4 & 4 & 4 & 4 & 1 \\ 1 & 2 & 2 & 2 & 2 & 2 & 2 & 2 & 1 \end{bmatrix}}{64}.$$

When the smooth unit 410 is a two-dimensional low pass filter, the image processing device 400 also includes a register 460. The register 460 is connected to the smooth unit 410, the level shifter 420, and the color strength unit 430, and is provided to temporarily store the color signal Cb/Cr and the luminance signal Y of the pixel and those of its adjacent pixels.

The image processing device 400 in accordance with the invention is specific to YCbCr signal. When the input image signal is RGB color signal, it may further include a color transformation unit, which transforms the RGB color signal corresponding to a pixel into the color signal Cb/Cr and the luminance signal Y corresponding to the pixel.

In the conventional techniques, the image signal only passes through filters to reduce overshooting, undershooting, and ring effect, and the output of the filters is taken as the result, but the artifact of color bleeding generated by using filters is not considered. In the present invention, the adjustment unit 450 is used to compare the signal Cb/Cr_smooth, which is the original signal after filtering, and the signal Cb/Cr_offset, which is the original signal after level-shifting, choose the one with fewer color components for being outputted as the result, and simultaneously, decide the limiting strength and the weighting based on the adjacent color data. Therefore, in the present invention, a smooth unit is simply used to reduce overshooting and undershooting, and avoid too much color bleeding so as to solve the color artifact problem in the boundary between different colors.

Although the present invention has been explained in relation to its preferred embodiment, it is to be understood that many other possible modifications and variations can be made without departing from the scope of the invention as hereinafter claimed.

What is claimed is:

1. An image processing device for reducing color artifact, comprising:
    a smooth unit, for receiving color signal corresponding to a pixel and adjacent pixels, and performing a smooth operation on the color signal to generate a smooth color signal relating to the pixel;
    a level shifter, for receiving the color signal and a luminance signal corresponding to the pixel, and performing a level-shifting on the color signal based on the luminance signal to generate a level-shifted color signal;
    a color strength unit, for receiving the color signal, and calculating a color strength indicator corresponding to the pixel based on the color signal;
    a gray level decision unit, connected to the color strength unit, for determining whether the pixel is in a gray level region or not based on the color strength indicator corresponding to the pixel and the adjacent pixels to generate a gray level indicator of the pixel; and
    an adjustment unit, connected to the smooth unit, the level shifter, and the gray level decision unit, for adjusting the smooth color signal and the level-shifted color signal based on the gray level indicator to generate an output color signal of the pixel.

2. The device as claimed in claim 1, wherein the level shifter comprises:
    an offset value decision unit, for receiving the luminance signal, and generating an offset value based on the luminance signal; and
    an offset adjustment unit, connected to the offset value decision unit for receiving the offset value and the color signal to generate the level-shifted color signal.

3. The device as claimed in claim 2, wherein, when the color signal is not smaller than zero, the color signal plus the offset value is provided as the level-shifted color signal, otherwise, the color signal minus the offset value is provided as the level-shifted color signal.

4. The device as claimed in claim 3, wherein the offset value decision unit proceeds to look up a first table based on the luminance signal to generate the offset value.

5. The device as claimed in claim 1, wherein the level shifter comprising:
    a gain value decision unit, for receiving the luminance signal, and generating a gain value based on the luminance signal; and a gain value decision unit, connected to the gain value decision unit, for multiplying the color signal by the gain value to generate the level-shifted color signal.

6. The device as claimed in claim 5, wherein the gain value decision unit proceeds to look up a second table based on the luminance signal to generate the gain value.

7. The device as claimed in claim 1, wherein the color strength unit calculates a color strength indicator corresponding to the pixel based on the following formula:

$$strength=Cr^2+Cb^2,$$

where strength represents the color strength indicator and Cr, Cb represent the color signal Cb/Cr.

8. The device as claimed in claim 1, wherein the gray level decision unit comprises:
a left color strength indicator average unit, for receiving the color strength indicators corresponding to the pixel and left side adjacent pixels from the adjacent pixels to generate a left color strength average indicator;
a right color strength indicator average unit, for receiving the color strength indicators corresponding to the pixel and right side adjacent pixels from the adjacent pixels to generate a right color strength average indicator; and
a minimum decision unit, connected to the left color strength indicator average unit and the right color strength indicator average unit for outputting one of the left color strength average indicator and the right color strength average indicator as the gray level indicator.

9. The device as claimed in claim 1, wherein the adjustment unit comprises:
a signed minimum unit, connected to the smooth unit and the level shifter, for generating a color extreme signal based on the smooth color signal;
a weighted value decision unit, connected to the gray level decision unit, for generating a weighted value based on the gray level indicator; and
a weight unit, for performing a weighted operation with the smooth color signal and the color extreme signal based on the weighted value to generate the output color signal.

10. The device as claimed in claim 9, wherein, when the smooth color signal is not smaller than zero, the signed minimum unit chooses the smaller one from the smooth color signal and the level-shifted color signal for being outputted as the color extreme signal, and otherwise, the signed minimum unit chooses the bigger one from the smooth color signal and the level-shifted color signal for being outputted as the color extreme signal.

11. The device as claimed in claim 10, wherein when the gray level indicator is bigger than a first threshold value, the weighted value is one, when the gray level indicator is smaller than a second threshold value, the weighted value is zero, and otherwise, the weighted value and the gray level indicator have a linear relationship.

12. The device as claimed in claim 11, wherein the weight unit generates the output color unit based on the following formula:

$$Cb/Cr\_out=\alpha \times Cb/Cr\_smooth+(1-\alpha)\times Cb/Cr\_min,$$

where α is the weighted value, Cb/Cr_out is the output color signal, Cb/Cr_smooth is the smooth color signal, and Cb/Cr_min is the color extreme signal.

13. The device as claimed in claim 1, wherein the smooth unit is a one-dimensional low pass filter.

14. The device as claimed in claim 1, wherein the smooth unit is a two-dimensional low pass filter.

15. The device as claimed in claim 14, further comprising:
a register, connected to the smooth unit, the level shifter, and the color strength unit, for temporarily storing the color signal and the luminance signal corresponding to the pixel and adjacent pixels.

16. An image processing method implemented in an image processing device for reducing color artifact, comprising:
a smooth step, for receiving color signal corresponding to a pixel and adjacent pixels, and performing a smooth operation on the color signal to generate a smooth color signal relating to the pixel;
a level-shifted step, for receiving the color signal and a luminance signal corresponding to the pixel, and performing a level-shifting on the color signal based on the luminance signal to generate a level-shifted color signal;
a color strength calculating step, for receiving the color signal, and generating a color strength indicator based on the color signal;
a gray level deciding step, for determining whether the pixel is in a gray level region or not based on the color strength indicator corresponding to the pixel and the adjacent pixels to generate a gray level indicator; and
an adjusting step, for adjusting the smooth color signal and the level-shifted color signal based on the gray level indicator to generate an output color signal.

17. The method as claimed in claim 16, wherein the level-shifted step comprises:
an offset value deciding step, for receiving the luminance signal, and generating an offset value based on the luminance signal, wherein the offset value deciding step proceeds to look up a first table based on the luminance signal, to generate the offset value; and
an offset adjusting step, for receiving the offset value and the color signal, to generate the level-shifted color signal,
wherein when the color signal is not smaller than zero, the color signal plus the offset value is provided as the level-shifted color signal, and otherwise, the color signal minus the offset value is provided as the level-shifted color signal.

18. The method as claimed in claim 17, wherein the color strength calculating step generates the color strength indicator corresponding to of the pixel based on the following formula:

$$strength=Cr^2+Cb^2,$$

where strength represents the color strength indicator and Cr, Cb represent the color signal Cb/Cr.

19. The method as claimed in claim 18, wherein the color strength calculating step comprises:
a left color strength indicator averaging step, for receiving the color strength indicators corresponding to the pixel and left side adjacent pixels from the adjacent pixels to generate a left color strength average indicator;
a right color strength indicator averaging step, for receiving the color strength indicators corresponding to the pixel and right side adjacent pixels from the adjacent pixels to generate a right color strength average indicator; and
a minimum deciding step, for outputting one of the left color strength average indicator and the right color strength average indicator as the gray level indicator.

20. The method as claimed in claim 16, wherein the adjusting step comprises:
a signed minimum step, for generating a color extreme signal based on the smooth color signal;
a weighted value deciding step, for generating a weighted value based on the gray level indicator; and
a weighting step, for performing a weighted operation with the smooth color signal and the color extreme signal based on the weighted value to generate the output color signal.

* * * * *